United States Patent
Hickman

(10) Patent No.: US 10,241,478 B2
(45) Date of Patent: Mar. 26, 2019

(54) DETERMINING STATES AND MODIFYING ENVIRONMENTS ACCORDING TO STATES

(71) Applicant: X Development LLC, Mountain View, CA (US)

(72) Inventor: Ryan Michael Hickman, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 348 days.

(21) Appl. No.: 14/602,585

(22) Filed: Jan. 22, 2015

(65) Prior Publication Data

US 2015/0134117 A1 May 14, 2015

Related U.S. Application Data

(63) Continuation of application No. 13/572,855, filed on Aug. 13, 2012, now Pat. No. 8,982,217.

(Continued)

(51) Int. Cl.
*H04N 7/18* (2006.01)
*G05B 15/02* (2006.01)
*H04L 29/08* (2006.01)

(52) U.S. Cl.
CPC .............. *G05B 15/02* (2013.01); *H04L 67/10* (2013.01); *H04N 7/185* (2013.01)

(58) Field of Classification Search
CPC ...................................................... G05B 15/02
See application file for complete search history.

(56) References Cited

U.S. PATENT DOCUMENTS

| 7,228,203 B2 | 6/2007 | Koselka et al. |
| 2002/0169733 A1* | 11/2002 | Peters, II ................. B25J 9/161 |
| | | 706/45 |

(Continued)

FOREIGN PATENT DOCUMENTS

| JP | 2000003795 A | 1/2000 |
| WO | 2005118982 A2 | 12/2005 |

OTHER PUBLICATIONS

Wortham, Jenna, 7 Ways to Automate Your Life With ifttt, The New York Times Blog, Gadgetwise, Sep. 23, 2011, available at http://gadgetwise.blogs.nytimes.com/2011/09/23/7waystoautomateyourlifewithifttt/?_r=0.

(Continued)

*Primary Examiner* — Tracy Y. Li
(74) *Attorney, Agent, or Firm* — McDonnell Boehnen Hulbert & Berghoff LLP

(57) ABSTRACT

Methods and systems for determining states of environments and modifying the environments according to the states are disclosed. In one aspect, the method includes a robot device determining for an environment a state comprising a plurality of state attributes for the environment. The method further includes receiving a request for the state and, in response to receiving the request, modifying the environment to comprise at least some of state attributes. The robot device may determine the state by receiving indications of at least some of the state attributes from some or all of a user, a server, another robot device, and another device. The attributes may be user attributes for a particular user, or may be event attributes for a particular type of event. The request may take the form of a request from a user, a calendar event, or a user arrival.

15 Claims, 6 Drawing Sheets

Related U.S. Application Data

(60) Provisional application No. 61/592,673, filed on Jan. 31, 2012.

(56) References Cited

U.S. PATENT DOCUMENTS

| | | |
|---|---|---|
| 2003/0074090 A1* | 4/2003 | Becka .................. G06Q 10/06 700/83 |
| 2004/0167667 A1 | 8/2004 | Goncalves et al. |
| 2005/0222711 A1 | 10/2005 | Yoshimi et al. |
| 2006/0064202 A1* | 3/2006 | Gutmann ............. G05D 1/0221 700/245 |
| 2006/0184279 A1 | 8/2006 | Okamoto et al. |
| 2006/0195409 A1* | 8/2006 | Sabe .................. G05B 13/0265 706/16 |
| 2006/0287769 A1 | 12/2006 | Yanagita et al. |
| 2007/0197195 A1* | 8/2007 | Sugiyama ............. G06Q 30/02 455/412.2 |
| 2012/0030194 A1 | 2/2012 | Jain |
| 2012/0158783 A1* | 6/2012 | Nice .................... G06Q 30/02 707/776 |

OTHER PUBLICATIONS

Pash, Adam, How to Supercharge All Your Favorite Webapps with ifttt, lifehacker, Sep. 21, 2011, available at http://lifehacker.com/5842307/how-to-supercharge-all-your-favorite-webapps-with-ifttt.

* cited by examiner

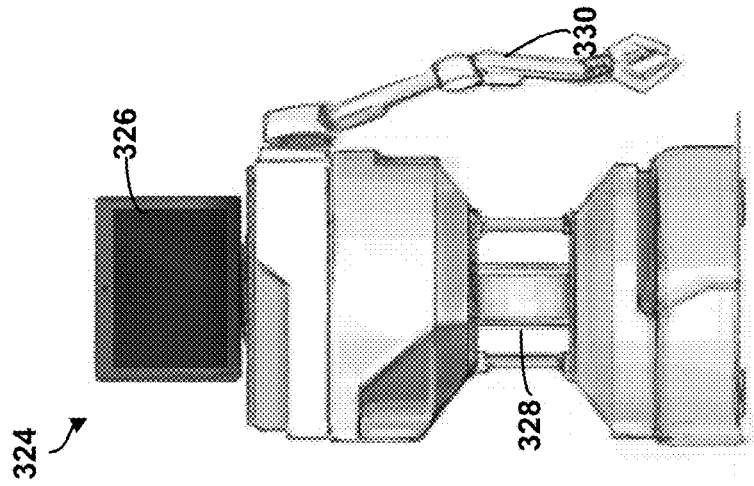
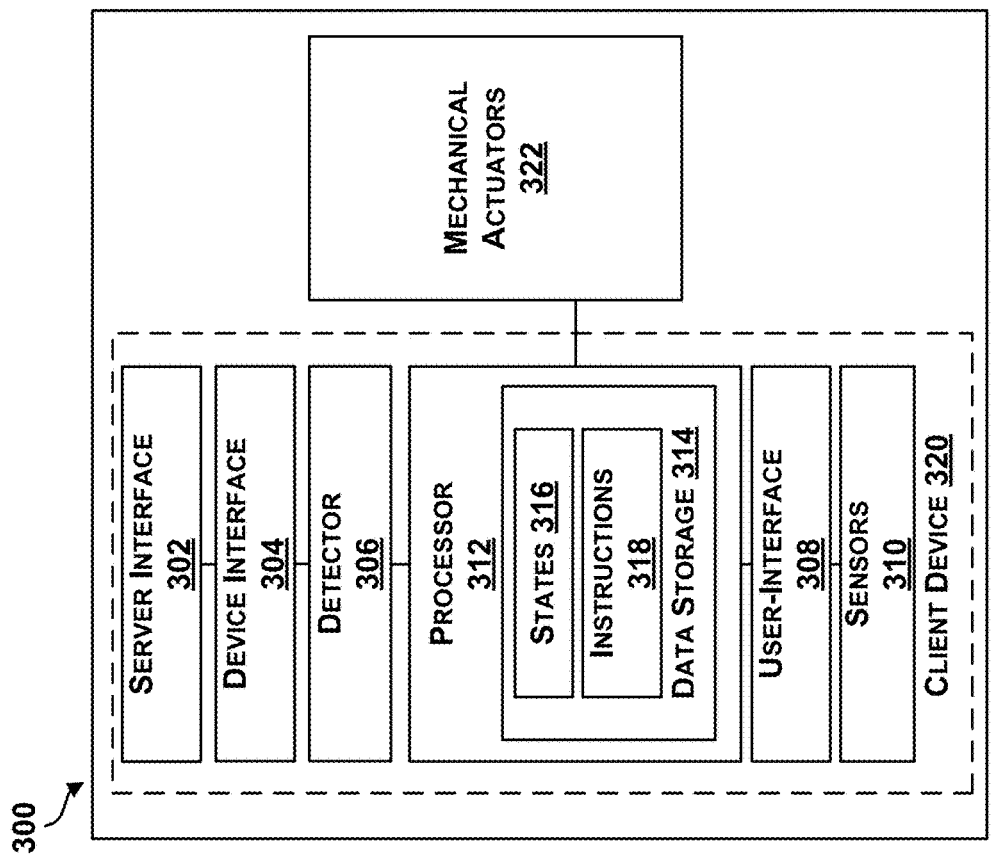
FIGURE 3B
FIGURE 3A

500

| STATE_JOHNSMITH | |
|---|---|
| SCREEN BRIGHTNESS | 4 |
| DESK CHAIR HEIGHT | 6.5 |
| TEMPERATURE | 71 |
| BEVERAGE | COFFEE |

| STATE_DINNERPARTY | |
|---|---|
| CHAIRS | 14 |
| LIGHTS | 4 |
| MUSIC | CLASSICAL |
| TABLECLOTH | WHITE |
| TEMPERATURE | 68 |

| STATE_WEEKEND | |
|---|---|
| LIGHTS | OFF |
| TEMPERATURE | 68 |
| PROJECTOR | OFF |
| ALARM SYSTEM | ON |

DETERMINING STATES AND MODIFYING ENVIRONMENTS ACCORDING TO STATES

CROSS-REFERENCE TO RELATED APPLICATIONS

This application is a continuation of U.S. patent application Ser. No. 13/572,855 filed Aug. 13, 2012, which claims the benefit of U.S. Provisional Application No. 61/592,673 filed Jan. 31, 2012, the entire contents of each of which are hereby incorporated by reference.

BACKGROUND

For a particular event, it may be desirable to arrange an environment in a particular state. For example, for a meeting, it may be desirable to turn on the lights and provide chairs for the meeting attendees. As another example, for a dinner party it may be desirable to turn on music and set the table. Other examples are possible as well.

Further, particular people may have preferences for an environment. For example, a particular person may prefer a particular temperature. As another example, a particular person may prefer a particular type or amount of lighting.

SUMMARY

Disclosed herein are cloud-based systems and methods for determining states of environments and modifying the environments according to the states. The disclosed cloud-based system may include a robot device that is configured to determine a state for an environment. The robot device may determine the state through observation, or in conjunction with input from a user, input from a server, input from another robot device, and/or input from another device. When desired, the robot device may modify the environment to create (or recreate) the determined state.

In one aspect, a method is disclosed. The method includes a robot device capturing an image of an arrangement of an environment and, based on the image, determining at least a portion of a state describing the arrangement using a plurality of state attributes. The method further include receiving a request for the state and, in response to receiving the request, the robot device causing the environment to be modified based on at least one of the state attributes to thereby recreate the arrangement.

In another aspect, a nontransitory computer readable medium is disclosed having stored therein instructions executable by a computing device to cause the computing device to perform the functions of the method described above.

In yet another aspect, a device is disclosed. The device includes at least one processor and data storage comprising instructions executable by the at least one processor to capture an image of an arrangement of an environment and, based on the image, determine at least a portion of a state describing the arrangement using a plurality of state attributes. The instructions are further executable by the processor to receive a request for the state and, in response to receiving the request, cause the environment to be modified based on at least one of the state attributes to thereby recreate the arrangement.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures,

FIG. 3A is a simplified block diagram of an example robot device;

FIG. 3B illustrates a graphical example of a robot device;

FIG. 5A shows example data for a determined state including user attributes;

FIG. 5B shows example data for a determined state including event attributes; and FIG. 5C shows example data for a determined state including temporal attributes, all arranged in accordance with at least some embodiments described herein.

DETAILED DESCRIPTION

Figure 1:
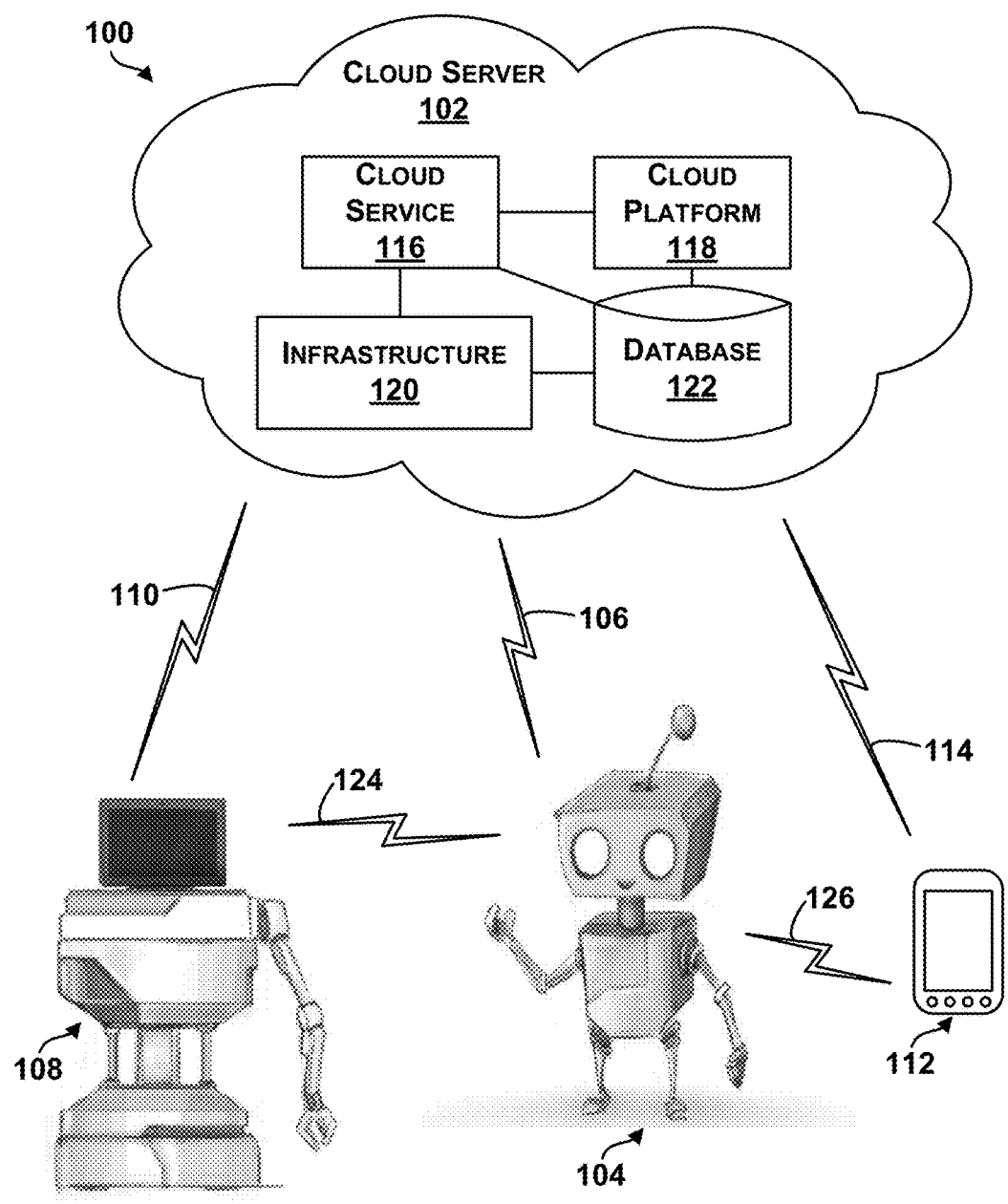
FIG. 1 is an example a system for determining states of environments and modifying the environments according to the states.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein and illustrated in the figures, can be arranged, substituted, combined, separated, and designed in a wide variety of different configurations, all of which are explicitly contemplated herein.

This disclosure may disclose, inter alia, cloud-based systems and methods for determining states of environments and modifying the environments according to the states.

States may refer to particular arrangements of environments. For example, a meeting state may refer to an arrangement of an environment for a meeting. As another example, a John Smith state may refer to an arrangement of an environment for a particular person, John Smith. As still another example, a weekend state may refer to an arrangement of an environment during a weekend. Other examples are possible as well.

The term environment may broadly refer to an aggregate of surrounding things, conditions, or influences. For instance, an environment may refer to any number of physical and/or non-physical aspects such as an arrangement of physical objects, time, date, temperature, presence of one or more users, sound, lighting conditions, etc. Other aspects are also contemplated. The environment may include living and/or non-living things and may also refer to a specific or general area.

Each state may describe an arrangement of an environment using a number of state attributes. State attributes may refer to any attribute of an environment. For example, the state attributes of the meeting state may include, for example, a number of chairs, a configuration of chairs, a level of lighting, and an inventory of objects needed for the meeting, such as a projector and a laser pointer. As another example, the state attributes of the John Smith state may include, for example, a temperature, a type of music, and a type of beverage preferred by John Smith. As still another example, the state attributes of the weekend state may include, for example, lights being powered off and an alarm system being powered on. Other examples are possible as well.

Each state may include various types of state attributes. Some state attributes may be user attributes for a particular user, such as a room temperature preferred by the particular user. Other state attributes may be event attributes for a particular type of event, such as an inventory of objects desired for the particular type of event. Still other state attributes may be temporal attributes for a particular time period, such as a level of lighting for the particular time period. Other types of attributes are possible as well. Any type of state attributes may be combined to determine a state. For example, a dinner party state may include a number of event attributes for a dinner party as well as a number of user attributes for guests at the dinner party. Other examples are possible as well.

States and state attributes may be determined at a server and a number of client devices, including a number of robot devices. The server and the client devices may share with one another data corresponding to states and state attributes for a number of environments. Further, some client devices, such as the robot devices, may be configured to modify environments according to the states.

Referring now to the figures, FIG. 1 is an example a system 100 for monitoring environmental conditions in an environment. As shown in FIG. 1, the system 100 includes a cloud server 102. The cloud server 102 is coupled to a first robot client 104 via a communication link 106. Further, the cloud server 102 is coupled to a second robot client 108 via a communication link 110. Still further, the cloud server 102 is coupled to a mobile client 112 via a communication link 114. Each of the first robot client 104, the second robot client 108, and the mobile client 112 may be communicatively coupled to one another, such as via communication links 124 and 126, respectively.

While one cloud server 102, two robot clients 104 and 108, and one mobile client 112 are shown, more or fewer cloud servers, robot clients, and mobile clients are possible as well. In addition, different types of client devices, besides robot clients 104 and 108 and mobile client 112, may be coupled to the cloud server 102. For example, any device that generally comprises a display system, memory, and a processor may be coupled to the cloud server 102.

The system 100 may be configured to operate in a cloud-based computing architecture. Cloud-based computing generally refers to networked computer architectures in which data storage and instruction execution may be divided, to some extent, between server and client devices. In the system 100, the cloud server 102 may be said to be a server device, while the robot clients 104 and 108 and the mobile client 112 may be said to be client devices. Thus, in the system 100, data storage and instruction execution may be divided, to some extent, between the cloud server 102, the robot clients 104 and 108, and the mobile client 112.

In particular, in the system 100, data indicating states and/or state attributes for a number of environments may be exchanged between the cloud server 102, the robot clients 104 and 108, and the mobile client 112. In this manner, the data indicating the states and state attributes for the environments may be said to be divided or shared between the cloud server 102, the robot clients 104 and 108, and the mobile client 112.

Further, in the system 100, instructions executable to determine the states may be exchanged between the cloud server 102, the robot clients 104 and 108, and the mobile client 112. In this manner, the instruction execution may be said to be divided or shared between the cloud server 102, the robot clients 104 and 108, and the mobile client 112.

In some embodiments, at least some of the data indicating the states and state attributes for the environments, and the instructions executable to determine the states, may be dynamically delivered to and/or downloaded by the robot clients 104 and 108, as needed or otherwise, for execution at the robot clients 104 and 108. In this manner, the robot clients 104 and 108 may access at least some of this data and instructions on a near real-time basis. Further, in some embodiments, downloaded data and instructions can be tailored to the specific capabilities of the robot clients 104 and 108 accessing the cloud server 102. Still further, in some embodiments, details of the architecture may be transparent to users of the robot clients 104 and 108. Dividing data and instruction storage and execution between the cloud server 102 and the robot clients 104 and 108 may allow more processing to be performed by the cloud server 102, taking advantage of the comparatively greater processing power and capability of the cloud server 102, for example.

In the system 100, the cloud server 102 includes a cloud service 104, a cloud platform 106, a cloud infrastructure 108, and a database 110. The cloud server 102 may include more or fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud server 102 may represent a networked computer architecture, and in one example, the cloud service 116 represents a queue for handling requests from client devices, such as the robot clients 104 and 108 and the mobile client 112. The cloud platform 118 may include a frontend of the cloud and may be coupled to the cloud service 116 to perform functions to interact with client devices. The cloud platform 118 may include applications used to access the cloud server 102 via a user interface, such as a web browser. The cloud infrastructure 120 may include service application of billing components of the cloud server 102, and thus, may interact with the cloud service 116. The database 122 may represent storage capabilities by the cloud server 102, and thus, may be accessed by any of the cloud service 116, the cloud platform 118, and/or the infrastructure 120. An example server is further described below in connection with FIG. 2.

As noted above, the system 100 includes robot clients 104 and 108, each of which is coupled to or otherwise configured to be capable of communicating with components of the cloud server 102. Each of the robot clients 104 and 108 may comprise any computing device that is configured to connect to the cloud server 102 and that has an actuation capability (e.g., electromechanical capabilities). Each robot client 104 and 108 may further be a combination of computing devices. Robot clients 104 and 108 may be located in the same environment, or may be located in different environments.

Further, as noted above, the system 100 includes mobile client 112 which is coupled to or otherwise configured to be capable of communication with components of the cloud server 102. While the mobile client 112 is shown as a smartphone, the mobile client 112 may comprise any computing device that is configured to connect to the cloud server 102. For example, the mobile client 112 may be a tablet or personal computer. Other examples are possible as well. Mobile client 112 may further be a combination of computing devices. Mobile client 112 may be located in the same environment as one or both of the robot clients 104 and 108, or may be located in a different environment.

Each of the robot clients 104 and 108 and the mobile client 112 may be configured to collect data corresponding to state attributes for environments. For example, one or more of the robot clients 104 and 108 and the mobile client 112 may be configured to collect the data corresponding to the state attributes through observation of the environment and/or by receiving an indication of the state attributes from a user. The robot clients 104 and 108 and the mobile client 112 may be configured to collect data corresponding to the state attributes in other manners as well.

Each of the robot clients 104 and 108 and the mobile client 112 may be further configured to share the data corresponding to the state attributes with one another and/or with the cloud server 102. The robot clients 104 and 108 and the mobile client 112 may share the data automatically, or upon request. For example, the robot clients 104 and 108 and the mobile client 112 may share the data with the server automatically and with one another upon request. Other examples are possible as well.

Each of the robot clients 104 and 108 and the mobile client 112 may be further configured to use the state attributes to determine one or more states for one or more environments. Each state may include a number of state attributes. The robot clients 104 and 108 and the mobile client 112 may store the states including the state attributes in data storage.

Each of the robot clients 104 and 108 and the mobile client 112 may be further configured to share the data corresponding to the states with one another and/or with the cloud server 102. The robot clients 104 and 108 and the mobile client 112 may share the data automatically, or upon request. For example, the robot clients 104 and 108 and the mobile client 112 may share the data with the server automatically and with one another upon request. Other examples are possible as well.

The robot clients 104 and 108 may be further configured to modify one or more environments according to the states. In particular, the robot clients 104 and 108 may be configured to modify an environment to include at least some of the state attributes of a state. The robot clients 104 and 108 may modify the environment themselves, or may instruct other robots or other devices to modify the environment. In one example, the robot clients 104 and 108 may be configured to communicate with another robot such as a building/home automation system and instruct the automation system to modify the environment. For instance, the automation system may receive instructions for modifying a temperature, lighting, etc., based on information from the robot clients 104 and/or 108.

An example robot device is further described below in connection with FIGS. 3A-B.

Each of the communication links 106, 110, 114, 124, and 126 shown in FIG. 1 may include wired links, such as serial or parallel buses, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

In some examples, the system 100 may include access points through which robot clients 104 and 108 and mobile client 112 may communicate with the cloud server 102. Access points may take various forms. For example, an access point may take the form of a wireless access point (WAP) or wireless router. As another example, if robot clients 104 or 108 or mobile device 112 connects using a cellular air-interface protocol, such as a CDMA or GSM protocol, an access point may be a base station in a cellular network that provides Internet connectivity via the cellular network.

As such, robot clients 104 and 108 and mobile client 112 may include a wired or wireless network interface through which to connect to the cloud server 102 (or access points). As an example, robot clients 104 and 108 and mobile client 112 may be configured to use one or more protocols such as 802.11, 802.16 (WiMAX), LTE, GSM, GPRS, CDMA, EV-DO, and/or HSPDA, among others. Furthermore, robot clients 104 and 108 and mobile client 112 may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2:
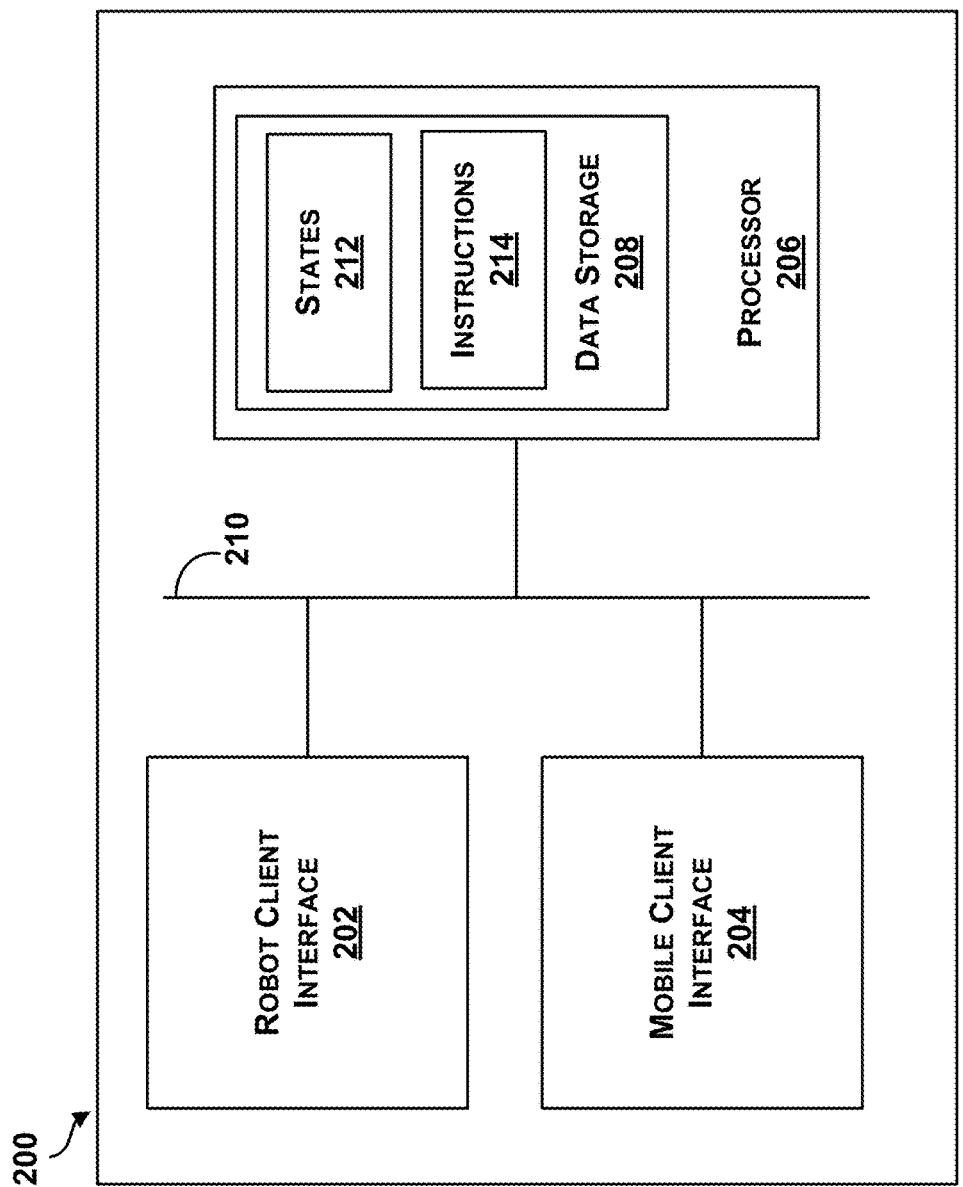
FIG. 2 is a simplified block diagram of an example server.

FIG. 2 is a simplified block diagram of an example server 200. The server 200 may take the form of a cloud server in a cloud-computing architecture, such as the system 100 described above in connection with FIG. 1. As shown, the server 200 includes a robot client interface 202, a mobile client interface 204, a processor 206, and data storage 208, all of which may be communicatively linked together by a system bus, network, and/or other connection mechanism 210.

The robot client interface 202 may be any interface configured to exchange with one or more robot devices (such as, for example, robot clients 104 and 108, as described above in connection with FIG. 1) data corresponding to states and/or state attributes for one or more environments. For example, the robot client interface 202 may be a wireless interface. To this end, the robot client interface 202 may include an antenna and a chipset for communicating with the robot devices over an air interface. The chipset or robot client interface 202 in general may be arranged to communicate according to one or more types of wireless communication (e.g. protocols), such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. Alternately or additionally, the robot client interface 202 may be a web-based interface accessible by the robot devices. The robot client interface 202 may take other forms as well.

The mobile client interface 204 may be any interface configured to exchange with one or more mobile clients (such as, for example, mobile client 112, as described above in connection with FIG. 1) data corresponding to states and/or state attributes for one or more environments. To this end, the mobile client interface 204 may be, for example, a wireless interface, such as any of the wireless interfaces described above.

In some embodiments, the robot client interface 202 and the mobile client interface 204 may be combined. Further, in some embodiments, the server 200 may include one or more additional interfaces configured to receive data from one or more additional entities, such as other client devices, and the Internet.

The processor 206 may comprise one or more general-purpose processors and/or one or more special-purpose processors. To the extent the processor 206 includes more than one processor, such processors could work separately or in combination. Further, the processor 206 may be integrated in whole or in part with the robot client interface 202, the mobile client interface 204, and/or with other components.

Data storage 208, in turn, may comprise one or more volatile and/or one or more non-volatile storage components, such as optical, magnetic, and/or organic storage, and data storage 208 may be integrated in whole or in part with the processor 206. Further, data storage 208 may contain states 212 and instructions 214 (e.g., program logic) executable by the processor 206 to carry out various server functions. In some embodiments, data storage 208 may additionally contain information associated with the states 212, information that can be used to retrieve the states 212 from a database, and/or information to determine the states 212.

Each state 212 may include a number of state attributes for an environment. For example, a state may include an inventory of objects in the environment and a position of each of the objects, or may include a level or type of lighting in the environment. Other examples are possible as well.

Some of the states 212 may be determined at the server 200 based on state attributes that are predetermined at the server 200 and/or received from the robot devices, mobile clients, and/or other client devices. Further, some of the states 212 may be received from the robot devices, mobile clients, and/or other client devices. Still further, some of the states 212 may be predetermined at the server 200.

Instructions 214 may be executable by the processor 206 to determine and maintain the states 212. Data storage 212 may include additional instructions as well.

FIG. 3A illustrates an example robot device 300. The robot device 300 may be used as a robot client in a cloud-computing architecture, such as the system 100 described above in connection with FIG. 1. As shown, the robot device 300 includes a client device 320 coupled to mechanical actuators 322. The client device 320 may include a server interface 302, a robot interface 304, a detector 306, a user-interface 308, sensors 310, a processor 312, and data storage 314, each interconnected.

The server interface 302 may be any interface configured to exchange with a server (such as, for example, server 200, as described above in connection with FIG. 2) information associated with states and/or state attributes for one or more environments. The information may be exchanged in response to a query from the robot device 300. The server interface 302 may be configured to transmit and receive other information as well.

In some embodiments, the server interface 302 may be a wireless interface. To this end, the server interface 302 may include an antenna and a chipset for communicating with the server over an air interface. The chipset or server interface 302 in general may be arranged to communicate according to one or more types of wireless communication (e.g. protocols), such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. Alternately or additionally, the server interface 302 may be a web-based application supported by the server and running on the robot device 300. The server interface 302 may take other forms as well.

The device interface 304 may be any interface configured to exchange with another device information associated with states and/or state attributes for one or more environments. The information may be exchanged in response to a query from the robot device 300. The device may be another robot device, a mobile device, or any other device. The device interface 304 may be configured to transmit and receive other information as well. To this end, the device interface 304 may be, for example, a wireless interface, such as any of the wireless interfaces described above.

In some embodiments, the server interface 302 and the device interface 304 may be combined. Further, in some embodiments, the robot device 300 may include one or more additional interfaces configured to receive data from one or more additional entities and/or the Internet.

Detector 306 may be any camera or other imaging device that is configured to capture an image of an arrangement of an environment. In embodiments where the detector 306 is a camera, the camera may be configured to detect visible light, or may be configured to detect light from other portions of the spectrum, such as infrared or ultraviolet light, or x-rays. Other types of cameras are possible as well. In embodiments where the detector 306 is an imaging device, the detector 306 may be a range detector. Other types of imaging devices are possible as well.

User-interface 308 may be an integrated user-interface that allows a user to interact with the robot device 300. In particular, user-interface 308 may be configured to receive from a user information associated with states and/or state attributes for one or more environments. To this end, user-interface 308 may include various buttons and/or a touch-screen interface that allow a user to provide input. Alternately or additionally, user-interface 308 may include a microphone configured to receive voice commands from a user. Other types of user-interfaces 308 are possible as well.

The sensors 310 may be any sensors configured to collect data corresponding to state attributes for one or more environments. For example, sensors 310 may include a temperature sensor configured to sense a temperature in the environment. The temperature may be a state attribute of the environment. As still another example, sensors 310 may include a light sensor configured to sense a level and/or a type of lighting in the environment. The level and/or the type of lighting may be a state attribute of the environment. Sensors 310 may alternately or additionally include one or more of cameras, Radio Frequency identification (RFID) systems, wireless sensors, range sensors, microphones or other audio sensors, speakers, and/or radar sensors. Other types of sensors 310 are possible as well.

The processor 312 may comprise one or more general-purpose processors and/or one or more special-purpose processors. To the extent the processor 312 includes more than one processor, such processors could work separately or in combination. Further, the processor 312 may be integrated in whole or in part with the server interface 302, the robot interface 304, the detector 306, the user-interface 308, any of the sensors 310, and/or with other components.

Data storage 314, in turn, may comprise one or more volatile and/or one or more non-volatile storage components, such as optical, magnetic, and/or organic storage, or may include non-transitory data storage, and data storage 314 may be integrated in whole or in part with the processor 312. Further, data storage 314 may contain states 316 and instructions 318 (e.g., program logic) executable by the processor 312 to carry out various robot device functions.

Each state 316 may describe an arrangement of an environment using a number of state attributes. For example, a state may include an inventory of objects in the environment and a position of each of the objects, or may include a level or type of lighting in the environment. Other examples are possible as well.

Portions of the states 316 may be determined based on information associated with states and/or state attributes that is received from the server via the server interface 302. Alternately or additionally, portions of the states 316 may be determined based on information associated with states and/or state attributes that is received from other robot devices, mobile devices, or other device via the device interface 304. Still alternately or additionally, portions of the states 316 may be determined based on one or more images captured using the detector 306. Still alternately or additionally, portions of the states 316 may be determined based on information associated with states and/or state attributes that is received from a user via the user-interface 308. Still alternately or additionally, portions of the states 316 may be determined based on data corresponding to the state attributes sensed at the sensors 310. Still alternately or additionally, portions of the states 316 may be predetermined at the robot device 300.

Instructions 318 may be executable by the processor 312 to determine states or portions of states for environments based on the information associated with states and/or state attributes received at the server interface 302, the device interface 304, and the user-interface 308. The information may include, for example, a portion of the state and/or one or more state attributes for the state.

Further, instructions 318 may be executable by the processor 312 to determine states or portions of states for environments based on the images captured by the detector 306. For example, instructions 318 may be executable by the processor 312 to analyze an image of an arrangement of an environment to identify one or more state attributes describing the arrangement. Alternately or additionally, instructions 318 may be executable by the processor 312 to compare an image of a first arrangement of an environment with an image of a second arrangement of the environment to identify one or more state attributes describing the second environment.

Still further, instructions 318 may be executable by the processor 312 to determine states or portions of states for environments based on the data collected at the sensors corresponding to state attributes for one or more environments.

Instructions 318 may be further executable by the processor 312 to combine portions of state and/or state attributes as determined from any of server interface 302, the device interface 304, the detector 306, the user-interface 308, and the sensors 310 to determine states and/or portions of states for environments.

Instructions 318 may be further executable by the processor 312 to receive a request for a determined state and, in response to receiving the request, cause the environment to be modified by one or more robot devices based on at least one of the state attributes included in the requested state. To this end, the instructions 318 may be executable by the processor 312 to use the mechanical actuators 322 to modify the environment and/or to transmit instructions to one or more other robot devices or devices to modify the environment.

Data storage 314 may include additional instructions as well.

In some embodiments, the client device 320 may include or be a module that can be connected to and disconnected from the robot device 300. For example, the client device 320 may be a mobile device or tablet computer. Other examples are possible as well.

In some embodiments, the client device 320 may be configured to physically connect to the robot device 300, such as by sitting on a "chest" of the robot device 300 to form an interactive display. In other embodiments, the client device 320 may be configured to wirelessly connect to the robot device 300 through, for example, a Bluetooth connection. Other wireless technologies are possible as well.

In some embodiments, the client device 320 may include one or more sensors that, when the client device 320 is connected to the robot device 300, serve as the sensors 310 for the robot device 300. For example, in embodiments where the client device 320 comprises a tablet computer, the sensors 310 may include those often found in tablet computers such as, for example, GPS receivers and cameras. Other examples are possible as well.

In some embodiments, the client device 320 may be configured to interact with the server, other robot devices, mobile clients, and/or other client devices whether connected to the robot device 300 or not, and may share information with the robot device 300 when connected. This may allow a user to download new states, state attributes, or other information for the robot device 300 from the server, other robot devices, mobile clients, and/or other client devices. For example, a predetermined state may be stored on at the server, and a user may be able to select this state using the client device 320 to download the state from the server, and when the client device 320 is placed into or coupled to the robot device 300, the robot device 300 would be able to store the state. Other examples are possible as well.

In some embodiments, one or more of the server interface 302, the robot interface 304, the detector 306, the user-interface 308, the sensors 310, the processor 312, and data storage 314 may be modules that can be removably connected to the client device 320 and/or the robot device 300. For example, one or more of the sensors 310 may be removably connected to the client device 320 and/or the robot device 300. This may allow a user to configure the types of data that will be collected by the robot device 300. For example, a user may connect an ambient temperature sensor to the client device 320 and/or the robot device 300, and the robot device 300 may then be able to collect data corresponding to the ambient temperature in an environment. Further, this may allow the robot device 300 to vary power consumption based on, for example, a battery power level of the robot device 300. For example, the robot device 300 may power off one or more sensors 310 to conserve power. Other examples are possible as well.

In embodiments where one or more of the server interface 302, the robot interface 304, the detector 306, the user-interface 308, the sensors 310, the processor 312, and data storage 314 are modules, any of the modules may be interconnected, and/or may communicate to receive data or instructions from each other so as to provide a specific output or functionality for the robot device 300.

The mechanical actuators 322 may include a moveable base, motors, wheels, movable arms, and/or other elements that enable robot device 300 to move in or interact with the environment.

FIG. 3B illustrates a graphical example of a robot device 324. The robot device 324 includes a client device 326, sensors 328, and a mechanical actuator 330. In this example, the client device 326 may be a smartphone or a tablet computer. Other examples are possible as well. In some embodiments, the client device 326 may include or may be connectable to the sensors 328. The sensors 328 may include any of the sensors described above. The mechanical actuator 330 may include a base, wheels, and a motor. In some embodiments, such as that shown, client device 326 and the sensors 328 can be positioned on the mechanical actuator 330. The robot device 324 may be configured in other ways as well.

Any of the robot devices illustrated in FIGS. 3A-3B may be configured to operate according to a robot operating system (e.g., an operating system designed for specific functions of the robot device). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software, and other examples. A robot operating system may include publish and subscribe functionality, and may also include functionality to control components of the robot device, such as head tracking, base movement (e.g., velocity control, navigation framework), etc.

Figure 4A:
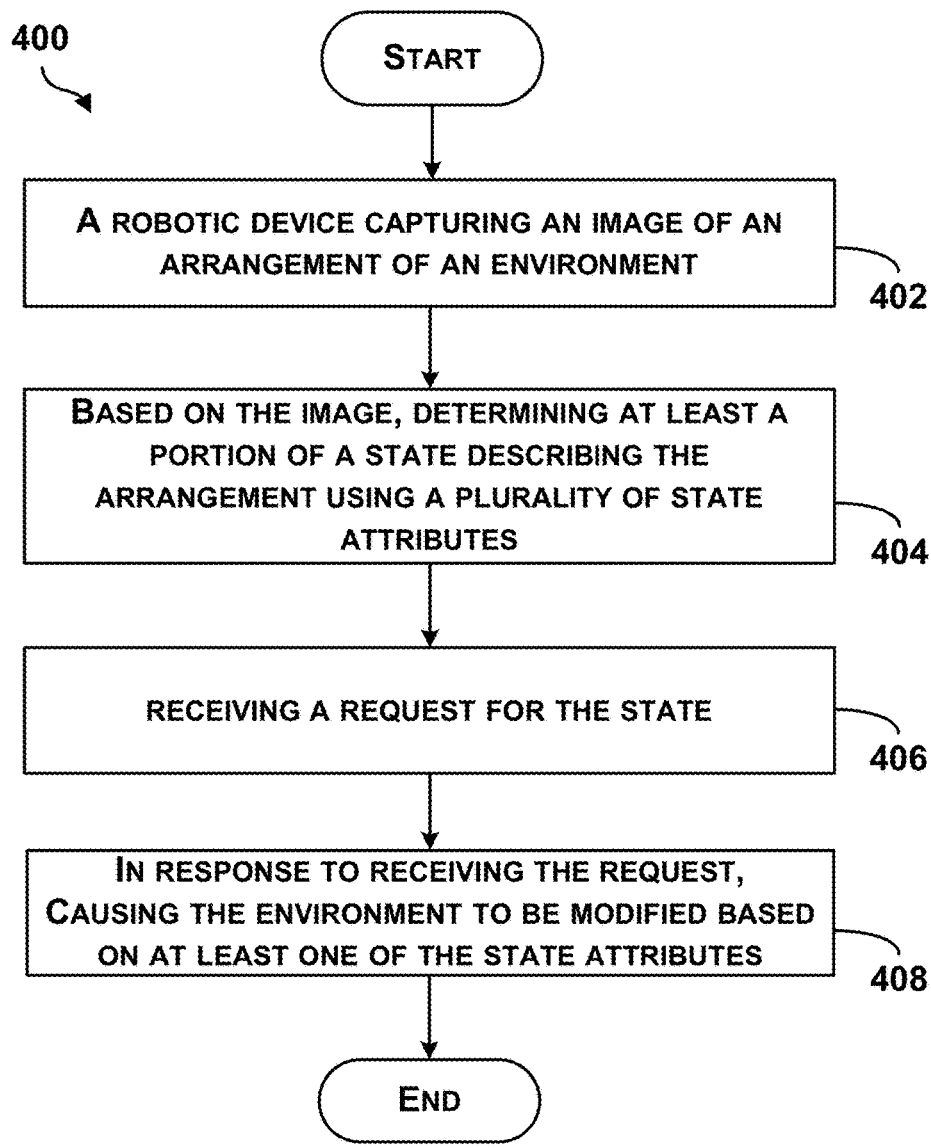
FIG. 4A is a block diagram of an example method for determining a state of an environment and modifying the environment according to the state.

FIG. 4A is a block diagram of an example method for determining a state of an environment and modifying the environment according to the state.

Method 400 shown in FIG. 4A presents an embodiment of a method that, for example, could be used with systems, devices, and servers described herein. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that store data for short periods of time like register memory, processor cache and Random Access Memory (RAM). The computer readable medium may also include nontransitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block may represent circuitry that is wired to perform the specific logical functions in the process.

As shown, the method 400 begins at block 402 where a robot device captures an image of an arrangement of an environment. The robot device may capture the image using, for example, a detector, such as the detector 306 described above in connection with FIG. 3A. Other examples are possible as well.

The method 400 continues at block 404 where the robot device determines, based on the image, at least a portion of a state describing the arrangement using a plurality of state attributes. For example, if the arrangement of the environment is a dinner party arrangement, the robot may determine at least a part of a dinner party state describing the dinner party arrangement using state attributes such as a number of chairs, a configuration of chairs, a temperature, a type of music, a volume of music, and a guest list. Other examples are possible as well.

In order to determine the state attributes, the robot device may perform image analysis on the image. For example, the robot device may use perform image analysis to recognize a number of objects in the environment, and may compile an inventory of the objects in the environment. The inventory may be a state attribute of the environment. As another example, the robot device may capture a second image as well, and may perform image analysis to determine differences between the image and the second image, such as the presence of an object in the second image and not in the image, or a dimming of lights from the image to the second image. The object and the dimmer lights may be state attributes of the environment. As still another example, the robot device may query a server with the image, and may receive, in response to the query, at least one state attribute and/or at least a portion of the state. The robot device may identify the state attributes based on the image in other manners as well.

In some embodiments, the robot device may determine at least a portion of the state in other manners as well.

In one aspect, the robot device may determine at least a portion of the state by receiving at least a portion of the state and/or information associated with at least one of the state attributes from a server, another robot device, a mobile device, or another client device. For example, the robot device may receive from the server a state determined at the server that includes the plurality of state attributes for the environment. As another example, the robot device may receive from another robot device a portion of the state determined at the other robot device that includes some of the state attributes for the environment. Other examples are possible as well.

In another aspect, the robot device may determine at least a portion of the state by receiving information associated with at least one of the state attributes from a user. For example, the robot device may receive from a user (e.g., through a user-interface) an indication of a preferred seat height for a chair in the environment. The user-preferred seat height may be a state attribute for the environment. As another example, the robot device may receive from a user a configuration of chairs for a meeting in the environment. The meeting chair configuration may be a state attribute for the environment. Other examples are possible as well.

In yet another aspect, the robot device may determine at least a portion of the state by using a number of sensors to sense the state attributes in the environment. For instance, the robot device may use a temperature sensor to sense the temperature in the environment, or may use a microphone to sense a volume of noise in the environment. The temperature and the volume may each be state attributes for the environment. As another example, the robot device may use a camera to capture one or more images of the environment, and may perform image analysis on the one or more images to identify the state attributes in the environment.

In yet another aspect, the robot device may identify the state attributes by receiving indications of the state attributes from a server, another robot device, a mobile client, or other client devices. For example, the robot device may receive from a mobile client a type of music preferred for the environment by a user of the mobile client. The user-preferred type of music may be a state attribute of the environment. Other examples are possible as well.

The robot device may combine the portions of the state and/or the state attributes determined in any of the manners above to determine the state. For example, the robot device may determine a number of state attributes by analyzing the image. Further, the robot device may receive from the server a portion of the state. The robot device may then determine the state by modifying the received state to include the determined state attributes. Other examples are possible as well.

Each state may include various types of state attributes. Some state attributes may be user attributes for a particular user, such as a room temperature preferred by the particular user. Other state attributes may be event attributes for a particular type of event, such as an inventory of objects desired for the particular type of event. Still other state attributes may be temporal attributes for a particular time period, such as a level of lighting for the particular time period. Other types of attributes are possible as well. Any type of state attributes may be combined to determine a state. For example, a dinner party state may include a number of event attributes for a dinner party as well as a number of user attributes for guests at the dinner party. Other examples are possible as well.

The method 400 continues at block 406 where the robot device receives a request for the state. The request may take a number of forms.

In some embodiments, the request may be a request for the state from a user. For example, the user may use a user-interface at the robot device to select the state from a list of states. As another example, a user may use a user-interface at a mobile client to determine the state, and the mobile client may transmit to the robot device the request for the state. Other examples are possible as well.

In other embodiments, the request may be a calendar event. To this end, the robot device may store or may have access to a calendar of the environment and/or a user of the environment. Particular calendar events may indicate to the robot device a request for the state. For example, a calendar event for a meeting may indicate to the robot device a request for a meeting state, and the state attributes of the meeting state may include a configuration of chairs, an inventory of supplies for the meeting, and/or a temperature for the environment. As another example, the calendar event for the meeting may indicate to the robot device a request for a user state of an attendee of the meeting, and the state attributes of the user state may include a lighting level and/or a beverage preferred for the user for the environment. Other examples are possible as well.

In other embodiments, the request may be a user arrival. The user arrival may be detected by the robot device, or may be indicated through, for example, user input and/or a calendar event. In either case, the user arrival may indicate to the robot device a request for the user's state. For example, the state attributes of the user's state may include a type of music preferred by the user, a type of lighting preferred by the user, and/or a type of beverage preferred by the user. Other examples are possible as well.

The request may take other forms as well.

In some embodiments, block 406 may precede blocks 402 and/or 404. For example, the robot device may receive a request for a state that is not yet determined at the robot device. In these embodiments, the robot device may determine the state in response to the request. The robot device may determine the state by, for example, querying the server, another robot device, a mobile client, another client device, or a user for the state, a portion of the state, and/or state attributes of the state.

The method 400 continues at block 408 where, in response to receiving the request, the robot device causes the environment to be modified based on at least one of the state attributes. For example, the robot device may bring to the environment one or more objects included in a state attribute of an inventory of objects for the state. As another example, the robot device may rearrange furniture in the environment according to a state attribute of an arrangement for the state. As yet another example, the robot device may power on or off one or more devices in the environment according to one or more state attributes for the state. As still another example, the robot device may adjust a temperature, volume, seat height, or lighting level in the environment according to one or more state attributes of the state. Other examples are possible as well.

In some embodiments, the robot device may itself modify the environment by, for example, using one or more mechanical actuators at the robot device to move objects in the environment. Further, in some embodiments the robot device may instruct one or more additional robot devices or devices to modify the environment. For instance, the robot device may provide instructions to at least one other robot device. The instructions may be executable by the at least one other robot device to adjust a temperature, volume, lighting, position, etc. The additional robot devices and devices may include, for example, a thermostat, a stereo, speakers, lights, or furniture, or a home automation system configured to control one or more parameters for a home. Other examples are possible as well.

The robot device may modify the environment in other manners as well.

Figure 4B:
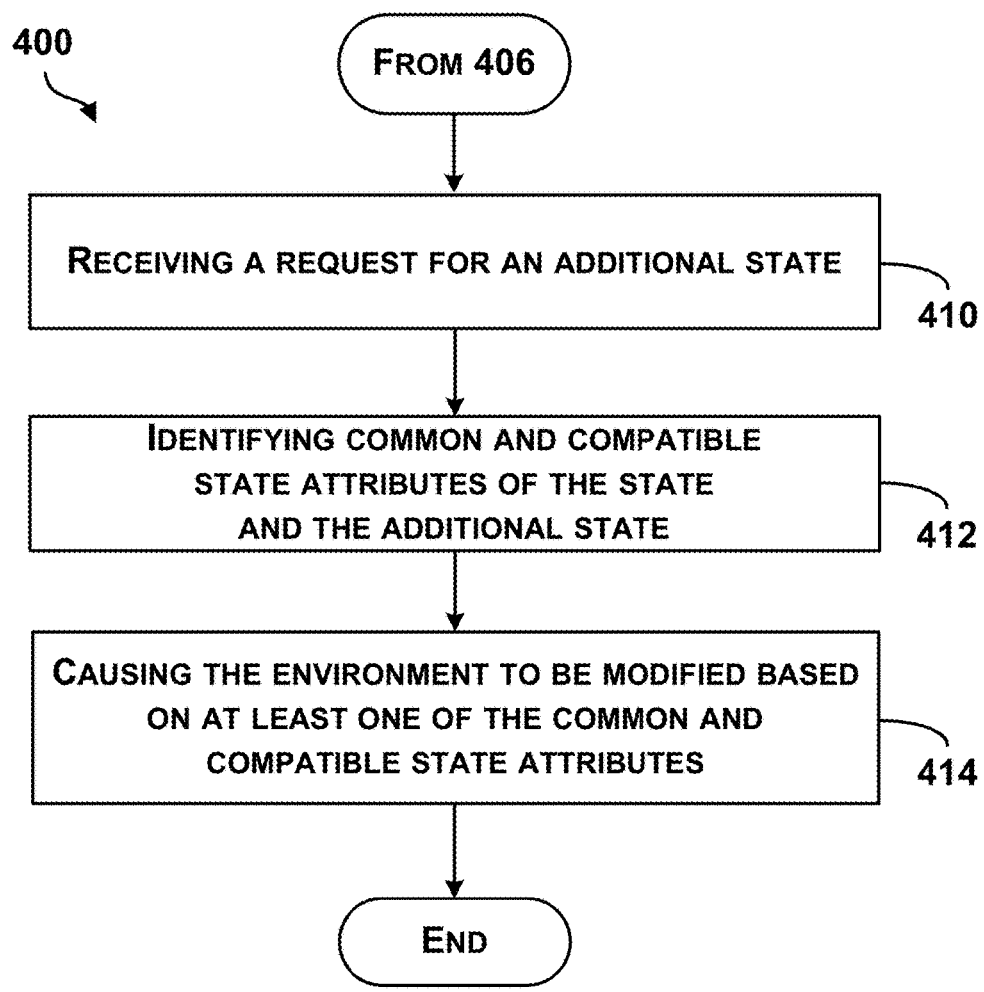
FIG. 4B is a block diagram of an example method for modifying an environment according to two states.

In some embodiments, a robot device may receive requests for two or more states for an environment at one time. For example, a user may plan a dinner party in an environment. Accordingly, the robot device may receive (e.g., from the user or from a calendar of the user) a request for a dinner party state. Additionally, the robot device may receive (e.g., from the user or from a calendar of the user) a request for a user state for a guest of the dinner party. In these embodiments, the method 400 may further include the robot device considering the state attributes of all of the states in order to modify the environment. FIG. 4B is a block diagram of an example method 400 for modifying an environment according to two states.

As shown, in these embodiments the method 400 may continue at block 410 where the robot device receives a request for an additional state. Thus, the robot device may have received requests for both the state and the additional state. In some embodiments, the requests may take the same form. For example, both of the requests may be received from a user. In other embodiments, the requests may take different forms. For example, the request for the state may be received from a user, while the request for the additional state may be in the form of a calendar event. Other examples are possible as well.

At block 412, the robot device may identify common and compatible state attributes of the state and the additional state.

Common state attributes may be those state attributes that are included in both the state and the additional state. Using the example of the dinner party above, the common state attributes may be state attributes that are included in both the dinner party state and the user state. For example, both the dinner party state and the user state may include a state attribute of classical music. Other examples are possible as well.

Compatible state attributes may be those state attributes that are included only in one of the states but do not conflict with any state attributes in the other state. Using the example of the dinner party above, the compatible state attributes may be state attributes that are included one of the dinner party state and the user state but do not conflict with any state attributes in the other of the dinner party state and the user state. For example, the dinner party state may include a state attribute of a 71° F. ambient temperature, and the user state may not indicate any temperature. Other examples are possible as well.

At block 414, the robot device may cause the environment to be modified based on at least one of the common and compatible state attributes. Using the example of the dinner party above, the robot device may modify the environment to include classical music and a 71° F. ambient temperature. Each of these state attributes either adhere to or do not conflict with the dinner party state and the user state. Other examples are possible as well.

In some cases, there may be state attributes of the state and/or the additional state that are neither common nor compatible. Such state attributes may be said to be conflicting state attributes. Using the example of the dinner party above, the dinner party state may include a state attribute of dim lighting, while the user state may include a state attribute of bright lighting. The robot device may identify such conflicting state attributes, and may resolve the conflicting state attributes in a number of ways.

In some embodiments, the robot device may resolve the conflicting state attributes by determining a compromise between the conflicting state attributes. Using the example of the dinner party above, the robot device may compromise the state attributes of dim lighting and bright lighting to arrive at medium lighting. In embodiments where the state attributes are numeric values, the robot device may compromise the state attributes by determining a weighted or unweighted mean or median. Alternately or additionally, the robot device may compromise the state attributes of dim lighting and bright lighting to arrive at dim overhead lighting and bright lamp lighting near a chair assigned to the user. The robot device may determine a compromise between conflicting state attributes in other manners as well.

In other embodiments, the robot device may resolve the conflicting state attributes by selecting one state attribute over the other. Using the example of the dinner party above, the robot device may select the state attribute of dim lighting over the state attribute of bright lighting, or may select the state attribute of bright lighting over the state attribute of dim lighting. In order to make such a selection, the robot device may query a user, the server, another robot device, or another device. Alternately or additionally, the robot device may consider a predetermined importance level of each of the dinner party state and the user state. Still alternately or additionally, in embodiments when more than two conflicting state attributes are being considered, the robot device may determine which state attributes outweigh others (e.g., for two state attributes of bright lighting and one state attribute of dim lighting, the robot device may select a state attribute of bright lighting). The robot device may select one state attribute over the other in other manners as well.

FIGS. 5A-C show example data for a number of determined states. It is to be understood that the example data is merely illustrative and is not meant to be limiting; other data and states are possible as well.

FIG. 5A shows example data 500 for a determined state 502 including user attributes 504. As shown, the determined state 502 is titled "State_JohnSmith." This may indicate that the state 502 is a user state indicating a number of user attributes 504. The user attributes 504 may reflect the preferences of the user John Smith. The user attributes 504 are shown to include "screen brightness," "desk chair height," "temperature," and "beverage" preferences for John Smith. While the preferences shown are mostly applicable to an office setting, in some embodiments the state 502 may additionally include preferences for a residential setting or another setting. Alternately, John Smith's preferences for other settings may be reflected in one or more additional states.

A robot device may store the state 502 for John Smith. The robot device may further receive a request for the state 502. The request may be, for example, a request from a user for the state 502. Alternately or additionally, the request may be a calendar event that lists John Smith as an attendee. Still alternately or additionally, the request may be John Smith's arrival, as detected by the robot device or as indicated by a user, other robot device, or other device. The request may take other forms as well.

In response to the request, the robot device may modify the environment to include at least some of the state attributes of the state 502 for John Smith. For example, the robot device may instruct lights in the environment to adjust to level 4 and may instruct a stereo in the environment to play rock music at volume level 7.2. Other examples are possible as well.

FIG. 5B shows example data 506 for a determined state 508 including event attributes 510. As shown, the determined state 508 is titled "State_DinnerParty." This may indicate that the state 508 is an event state indicating a number of event attributes 510. The event attributes 510 may reflect typical or user-specified preferences for a dinner party. The event attributes 510 are shown to include "chairs," "lights," "music," "tablecloth," and "temperature" for dinner parties.

A robot device may store the state 506 for dinner parties. The robot device may further receive a request for the state 506. The request may be, for example, a request from a user for the state 506. Alternately or additionally, the request may be a calendar event for a dinner party. The request may take other forms as well.

In response to the request, the robot device may modify the environment to include at least some of the state attributes of the state 506 for dinner parties. For example, the robot device may arrange fourteen chairs in the environment, and may place a white tablecloth on the table. Other examples are possible as well.

FIG. 5C shows example data 512 for a determined state 514 including temporal attributes 516. As shown, the determined state 514 is titled "State_Weekend." This may indicate that the state 514 is a temporal state indicating a number of temporal attributes 516. The temporal attributes 516 may reflect typical or user-specified preferences for a weekend. The temporal attributes 516 are shown to include "lights," "temperature," "projector," and "alarm system" for weekends.

A robot device may store the state 514 for weekends. The robot device may further receive a request for the state 514. The request may be, for example, a request from a user for the state 514. Alternately or additionally, the request may be a calendar day that is a weekend. The request may take other forms as well.

In response to the request, the robot device may modify the environment to include at least some of the state attributes of the state 514 for weekends. For example, the robot device may instruct the projector to turn off and may turn on the alarm system. Other examples are possible as well.

While the states 502, 508, and 514 above are shown to include only one type of state attribute (user attributes, event attributes, and temporal attributes, respectively), in some embodiments one or more of the example data 500, 506, and 512 may include other types of attributes as well, or any of the states described herein may be combined. For example, the state 508 may include a list of guests, and may further include a number of user attributes for the guests. As another example, the state 514 may include an event that is occurring during the weekend, and may further include a number of event attributes for the event. Other examples are possible as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by a computing device, data corresponding to a desired state for a particular environment, wherein the data corresponding to the desired state comprises: at least one state attribute describing a desired attribute for the particular environment, and a condition for causing the desired state to be created when the condition is satisfied;
   monitoring, by the computing device, the particular environment using a plurality of images from at least one camera on a mobile device positioned in the particular environment, wherein monitoring the particular environment includes performing image analysis on images in the plurality of images to compile an inventory of objects in the particular environment;
   while monitoring the particular environment, detecting a change in the particular environment based on the plurality of images, wherein detecting the change involves identifying a difference in the inventory of objects in the particular environment between a first image and a second image of the plurality of images;
   based on the detected change in the particular environment, determining, by the computing device, that the condition is satisfied; and
   responsive to determining that the condition is satisfied, causing one or more other devices to adjust operation to modify the at least one state attribute for the particular environment, thereby creating the desired state.

2. The method of claim 1, wherein the computing device comprises a server, and wherein the computing device receives the data corresponding to the desired state from a client device.

3. The method of claim 2, wherein determining that the condition is satisfied comprises:
   the server requesting data related to the condition from the client device; and
   the server determining, based on data related to the condition that is received from the client device, that the condition is satisfied.

4. The method of claim 3, wherein the condition comprises a presence of a particular user in the particular environment, and wherein the data related to the condition indicates that the particular user is present in the particular environment.

5. The method of claim 1, wherein the condition comprises a presence of a particular user in the particular environment, and wherein determining that the condition is satisfied comprises receiving an indication that the particular user is present in the particular environment.

6. The method of claim 1, wherein the condition comprises a condition selected from the group consisting of: a time of day, a day of week, a particular date, or a particular time on a particular date.

7. The method of claim 1, wherein the data corresponding to the desired state comprises a calendar event indicating: the at least one state attribute and a time for creating the desired state.

8. The method of claim 1, wherein causing the one or more other devices to modify the at least one state attribute for the particular environment comprises causing the one or more other devices to power on or off.

9. The method of claim 1, wherein the one or more other devices comprise a building/home automation system.

10. The method of claim 1, wherein the one or more other devices comprise a robot in the particular environment.

11. A device comprising:
    at least one processor; and
    memory including instructions executable by the at least one processor to cause the device to perform functions comprising:
       maintaining a state database having individual data corresponding to each of a plurality of desired states for a particular environment, wherein the individual data for each of the plurality of desired states comprises one or more corresponding state attributes describing a desired attribute for the particular environment,
       identifying a need to produce a particular one of the plurality of desired states in the particular environment, wherein the particular desired state involves a user-specific state,
       monitoring the particular environment using a plurality of images from at least one camera on a mobile device positioned in the particular environment, wherein monitoring the particular environment includes performing image analysis on images in the plurality of images to compile an inventory of objects in the particular environment, while monitoring the particular environment, detecting a change in the particular environment based on the plurality of images, wherein detecting the change involves identifying a difference in the inventory of objects in the particular environment between a first image and a second image of the plurality of images, determining that a user associated with the user-specific state is present in the particular environment, and responsive to determining that the user associated with the user-specific state is present in the particular environment and based on the detected change in the particular environment, causing one or more other devices to adjust operation in the particular environment to modify at least one state attribute corresponding to the particular desired state.

12. The device of claim 11, wherein the particular desired state comprises an event-specific state, and wherein identifying the need to produce the particular desired state comprises determining that an event associated with the particular desired state is scheduled to occur within a predetermined amount of time.

13. The device of claim 11, wherein the particular desired state is specific to a particular day of the week, and wherein identifying the need to produce the particular desired state comprises determining that it is the particular day of the week.

14. The device of claim 11, wherein the functions further comprise:

receiving a request to store a current state of the particular environment in the state database, responsive to receiving the request, querying at least one sensor in the particular environment to determine at least one current state attribute, and adding a new state to the state database that has individual data indicating the at least one current state attribute.

15. The device of claim 11, wherein the functions further comprise:

receiving from a client device individual data for a new state that includes at least one state attribute for the new state, and adding to the state database another state that includes the individual data.

* * * * *